Patented Nov. 6, 1923.

1,472,974

UNITED STATES PATENT OFFICE.

ANTHONY GRECO, OF SAN JOSE, CALIFORNIA.

METHOD OF TREATING FRUIT TO BE DRIED.

No Drawing. Application filed August 28, 1922. Serial No. 584,882.

*To all whom it may concern:*

Be it known that I, ANTHONY GRECO, a citizen of the United States, residing at San Jose, in the county of Santa Clara and State of California, have invented certain new and useful Improvements in Methods of Treating Fruit to be Dried, of which the following is a specification.

The hereinafter described invention relates to the method for the treatment of certain fruits, such, for instance, as apricots and peaches, preparatory to placing of the same in dried condition; the objects of the invention being to improve the appearance of the fruit as to color, when dried; to render the dried fruit more pliable; to improve the flavor thereof, and, in general, better the marketable condition thereof.

As well known, the common practice in connection with the drying of such fresh fruit is to first halve the same for the removal of the stone therefrom. The halved peaches or apricots are then placed on drying trays, with the cup side or cavity face thereof uppermost, and exposed to the action of the sun for a given time for the drying thereof, it being understood that the fruit is bleached in the usual manner. With fruit thus treated and dried, the tendency is for the same to shrivel or curl up, and the dried fruit being in a somewhat hardened or tough condition, due to the moisture being evaporated therefrom during the drying process.

I have discovered from practical operation that by the employment of the hereinafter described method of treating the fruit, the fresh fruit when dried is rendered soft and pliable; has an improved or enhanced appearance as to color, and the sugar or saccharine contents thereof increased.

My method invention resides in halving the ripe fruit for the removal of the stone therefrom; placing the halved fruit on suitable trays with the cup or cavity face thereof uppermost; spraying or lightly covering the exposed surface of the fresh cut fruit with a saline solution or coating of saline material; then filling the cup or cavity of each half of the fruit with sugar or saccharine material.

The fruit thus treated, while on the trays, is then subjected to a sulphuring or bleaching action, and, afterwards, the trays, with the bleached fruit thereon, are placed on the ground for exposure to the sun and atmosphere for drying purposes.

The purpose of applying the saline solution or saline material to the surface of the fresh fruit is to cause, by the absorption thereof, the retention of the moisture of the fruit.

The sugar or saccharine material with which the cup or cavity of the fresh fruit is filled is absorbed into the pores of the fruit and increases the sugar content or sweetness of the said fruit.

When the fruit thus treated, after the sulphuring or bleaching thereof, is subjected to the action of the sun and atmosphere for drying purposes, the moisture contents are not evaporated therefrom to the extent as heretofore in the treatment of the fruit, with the result that the fruit when dried is in a moist, pliable and softened condition and the fruit as dried flattens out rather than curling up, as heretofore.

The fruit treated under my invention is greatly improved in general appearance as to color. It is somewhat enlarged as to volume and is materially enhanced as to its sugar or saccharine contents and by reason of such increased saccharine contents, it is not required that the house-wife, when utilizing the fruit for domestic purposes, add the sugar thereto at present required to be added to dried fruits treated under the methods heretofore resorted to, nor is it required to add the water thereto as heretofore found necessary, due to the fact that the moisture is retained in the dried fruit.

By reason of the general enhanced appearance of the fruit when dried, the same commands a better price in the market than the fresh fruit dried by the methods heretofore resorted to.

In the carrying out of my method invention, there is utilized to one ton of fruit a saline spraying solution, in which is incorporated approximately fifteen pounds of salt, and for one ton of halved fruit there is required approximately eighty-five pounds of sugar in order to fill the cup cavities of the halved sections.

Preferably the cut surface of the fruit is subjected to the action of a saline solution prior to applying the saccharine material to the cup cavity of the fruit, but it will be understood that the saline material need not be applied in solution form, and I do not wish to be understood as so limiting or restricting the invention.

Having thus described my invention, what is claimed as new and desired to be protected by Letters Patent is:—

The method of drying fresh fruit which comprises halving the fruit and removing the stone therefrom, subjecting the cut surface of the fruit to the action of a saline material, then filling the cup cavity of the saline treated fruit with saccharine material, bleaching the fruit, and then exposing the same to the action of the sun and atmosphere for drying purposes.

In testimony whereof I have signed my name to this specification.

ANTHONY GRECO.